(12) United States Patent
Worstell

(10) Patent No.: US 7,115,875 B1
(45) Date of Patent: Oct. 3, 2006

(54) PET SCANNER WITH PHOTODETECTORS AND WAVELENGTH SHIFTING FIBERS

(75) Inventor: William A. Worstell, Wayland, MA (US)

(73) Assignee: PhotoDetection Systems, Inc., Acton, MA (US)

( * ) Notice: Subject to any disclaimer, the term of this patent is extended or adjusted under 35 U.S.C. 154(b) by 311 days.

(21) Appl. No.: 10/780,517

(22) Filed: Feb. 17, 2004

(51) Int. Cl.
G01T 1/164 (2006.01)
G01T 1/202 (2006.01)

(52) U.S. Cl. .................. 250/363.03; 250/363.04; 250/367; 250/368; 250/370.11

(58) Field of Classification Search .......... 250/363.03, 250/363.04, 367, 368
See application file for complete search history.

(56) References Cited

U.S. PATENT DOCUMENTS

| | | | |
|---|---|---|---|
| 4,284,890 A | 8/1981 | Thompson | 250/363 |
| 4,395,635 A | 7/1983 | Friauf et al. | |
| 4,959,809 A * | 9/1990 | Rogers et al. | 250/369 |
| 5,241,181 A | 8/1993 | Mertens et al. | 250/363.04 |
| 5,395,635 A | 3/1995 | Yanamoto et al. | 426/331 |
| 5,506,408 A * | 4/1996 | Vickers et al. | 250/366 |
| 5,600,144 A | 2/1997 | Worstell | 250/363.3 |
| 5,741,056 A | 4/1998 | Liu | 353/56 |
| 5,780,856 A * | 7/1998 | Oka et al. | 250/367 |
| 5,783,829 A | 7/1998 | Sealock et al. | 250/367 |
| 5,793,045 A | 8/1998 | DiFilippo et al. | 250/363.03 |
| 5,847,395 A * | 12/1998 | Malmin et al. | 250/363.07 |
| 5,937,202 A | 8/1999 | Crosetto | 395/800.19 |
| 6,057,551 A | 5/2000 | Tararine | |
| 6,072,177 A | 6/2000 | McCroskey et al. | 250/252.1 |
| 6,078,052 A * | 6/2000 | DiFilippo | 250/367 |
| 6,255,655 B1 | 7/2001 | McCroskey et al. | |
| 6,459,085 B1 * | 10/2002 | Chang et al. | 250/370.11 |
| 6,853,707 B1 * | 2/2005 | Kerschner | 250/370.09 |

FOREIGN PATENT DOCUMENTS

GB 2052207 A * 1/1981

OTHER PUBLICATIONS

Gagnon, D. et al. "Maximum Likelihood Positioning in the Scintillation Camera Using Depth of Interaction". IEEE Trans. on Medical Imaging, vol. 12, No. 1 (Mar. 1993), pp. 101-107.*
Aarsvold, J.N. et al. "Implementations of Maximum-Likelihood Position Estimation in a Four-PMT Scintillation Detector". Nuclear Science Symposium and Medical Imaging Conference Record, vol. 3 (Oct. 21-28, 1995), pp. 1811-1815.*
D.F. Newport, H.M. Dent, M.E. Casey and D.W. Bouldin, "Coincidence Detection and Selection in Positron Emission Tomography Using VLSI", IEEE: Transactions of Nuclear Science, vol. 36, No. 1, Feb. 1989, pp. 1052-1055.
J.W. Young, M.E. Casey and D.F. Newport, "Optimum Bandwidth Usage in Digital Coincidence Detection for PET", IEEE, 1994, 1205-1208.
W.F. Jones, J.H. Reed, J.L. Everman, J.W. Young and R.D. Seese, "Next Generation PET Data Acquisition Architectures", IEEE, Transactions on Nuclear Science, vol. 44, No. 3, Jun. 1997, pp. 1202-1207.
Worstell et al. "Scintillator Crystal Readout with Wavelength-Shifting Optical Fibers" Boston University Physics Department, pp. 1869-1873.

* cited by examiner

Primary Examiner—David Porta
Assistant Examiner—Frederick F. Rosenberger
(74) Attorney, Agent, or Firm—Fish & Richardson P.C.

(57) ABSTRACT

A method for estimating a location of a most-likely photon source on a scintillator block includes obtaining a measured photodetector signal indicative of a distribution of photons received by a plurality of photodetectors from a photon source on a scintillator block; and obtaining a measured fiber signal indicative of a distribution of photons received by a plurality of wavelength-shifting fibers extending across the scintillator block from a photon source on a scintillator block.

27 Claims, 12 Drawing Sheets

PET SCANNER WITH PHOTODETECTORS AND WAVELENGTH SHIFTING FIBERS

FIELD OF INVENTION

This invention relates to positron emission tomography ("PET") scanners, and in particular, to enhancing spatial and temporal resolution of a PET scanner.

BACKGROUND

In positron emission tomography ("PET"), a radioactive material is placed in the patient. In the process of radioactive decay, this material emits positrons. These positrons travel through the patient until they encounter electrons. When a positron and an electron meet, they annihilate each other. This results in emission of two gamma ray photons that exit the patient traveling in opposite directions. By detecting these pairs of gamma ray photons, one can infer where an annihilation event occurred, and thereby determine the distribution of the radioactive material within the patient.

To detect these pairs of gamma ray photons, (which will now be referred to as "gamma rays") it is useful to surround the patient with scintillating crystals. When a positron and electron annihilate within the patient, the resulting pair of gamma rays enter opposed scintillating crystals. These gamma rays then interact with the scintillation crystal. In so doing, they cause the emission of an isotropic spray of scintillation photons centered at a point at which the gamma ray interacts with the scintillation crystal. These scintillation photons can be detected by photodetectors in optical communication with the scintillation crystal.

Some of these scintillation photons are emitted in a direction that takes them to the photodetectors. Other scintillation photons, which are emitted in a direction away from any photodetector, nevertheless manage to reach a photodetector after being redirected by structures within the scintillating crystal. Yet other scintillation photons are absorbed and therefore never reach the photodetectors at all.

To detect gamma ray photons, the patient is positioned within a ring of scintillating crystals. Photodetectors observing the crystals can then detect the scintillation photons and provide, to a processor, information on how many scintillation photons were received and from which scintillation crystals they were received. The processor then processes such data arriving from all photodetectors to form an image showing the spatial distribution of radioactive material within the patient.

Each photodetector provides a signal whose intensity indicates the number of scintillation photons reaching that photodetector. Because the photodetector has a large receiving cross section, it is able to detect many scintillation photons. As a result, the photodetector is able to determine, with great precision, when the gamma ray interacted with the material. However, the large receiving cross section of the photodetector limits its ability to provide precise information on where the gamma ray interacted with the scintillating crystal.

To enhance the spatial resolution of a PET scanner, one can place an array of wavelength-shifting, or fluorescent optical fibers in optical communication with the photomultipliers and the scintillation crystal. Scintillation photons can then enter the fluorescent optical fibers. In so doing, the scintillation photons are absorbed. This causes the optical fiber to fluoresce. The photons emitted within the fiber, which will be called "re-emitted photons", propagate toward a photosensor in optical communication with each fiber.

Because the fluorescent optical fibers are much narrower than the photomultiplier tubes, the fiber array provides more spatial resolution than the photomultiplier tubes. This enables the fiber array to provide more precise information on where the gamma ray interacted with the scintillating crystal.

The small diameter of each fiber and the limited probability that the fiber will capture a scintillation photon, means that each fiber collects only a limited number of scintillation photons. As a result, the signal provided by the fiber array provides only limited temporal resolution. This makes it difficult to correlate signals from the fiber array with signals from the photomultipliers, particularly when the intervals between events are short.

SUMMARY

In one aspect of the invention, an apparatus includes photodetectors disposed to receive photons from a scintillator block of a PET scanner and configured to provide a measured photodetector signal indicative of a distribution of photons detected by the photodetectors; and wavelength-shifting fibers disposed to receive photons from the scintillator block and configured to provide a measured fiber signal indicative of a distribution of photons received by the fibers.

Embodiments of this aspect of the invention may include one or more of the following features.

A processor is configured to estimate a location of a photon source based on the measured photodetector signal and on the measured fiber signal.

A processor is configured to estimate a location of a photon source based on a reference photodetector signal.

A processor is configured to estimate a location of a photon source based on a reference fiber signal.

A processor is configured to estimate an extent to which the estimated location is the correct location.

A stored calibration table contains values derived from the set of known photodetector signals.

A stored calibration table containing values derived from the set of known fiber signals.

The processor is configured to estimate a location of a photon source by estimating the likelihood that the measured photodetector signal and the measured fiber signal resulted from photons emitted at the photon source.

The processor is configured to estimate a location of a photon source by estimating the likelihood that the measured photodetector signal and the measured fiber signal resulted from photons emitted at each of a plurality of photon sources.

The processor is configured to estimate a location of a photon source by determining which of the photon sources is associated with the maximum likelihood that the measured photodetector signal and the measured fiber signal resulted from photons emitted at that photon source.

The processor is configured to estimate a location of a photon source by identifying, from a plurality of photon sources, a photon source having the property that the likelihood that the measured photodetector signal and the measured fiber signal resulted from photons emitted at that photon source is greater than the likelihood that the measured photodetector signal and the measured fiber signal resulted from photons emitted at a source other than that photon source.

The processor is configured to estimate a location of a photon source by estimating a first value indicative of a first likelihood, the first likelihood being the likelihood that the measured photodetector signal and the measured fiber signal resulted from photons emitted at a first photon source; estimating a second value indicative of a second likelihood, the second likelihood being the likelihood that the measured photodetector signal and the measured fiber signal resulted from photons emitted at a second photon source; determining, on the basis of the first and second values, that the first likelihood is greater than the second likelihood; and designating the first photon source to be the photon source from which from which the photons that caused the measured photodetector signal and the measured fiber signal were emitted.

Another aspect of the invention includes obtaining a measured photodetector signal indicative of a distribution of photons received by a plurality of photodetectors from a photon source on a scintillator block of a PET scanner; and obtaining a measured fiber signal indicative of a distribution of photons received by a plurality of wavelength-shifting fibers extending across the scintillator block from a photon source on a scintillator block.

Embodiments of this aspect of the invention may include one or more of the following features.

An additional step of estimating a location of the photon source on the scintillator block based on the measured photodetector signal and on the measured fiber signal.

Estimating a location of the photon source by estimating the location based on a reference photodetector signal.

Estimating a location of the most likely photon source by estimating the location based on a reference fiber signal.

Estimating an extent to which the estimated location is the correct location.

The additional step of reading a stored calibration table containing values derived from the set of known photodetector signals.

The additional step of reading a stored calibration table containing values derived from the set of known fiber signals.

Estimating a location of the photon source by estimating the likelihood that the measured photodetector signal and the measured fiber signal resulted from photons emitted at the photon source.

Estimating a location of a photon source by estimating the likelihood that the measured photodetector signal and the measured fiber signal resulted from photons emitted at each of a plurality of photon sources.

Estimating a location of a photon source by determining which of the photon sources is associated with the maximum likelihood that the measured photodetector signal and the measured fiber signal resulted from photons emitted at that photon source.

Estimating a location of a photon source by identifying, from a plurality of photon sources, a photon source having the property that the likelihood that the measured photodetector signal and the measured fiber signal resulted from photons emitted at that photon source is greater than the likelihood that the measured photodetector signal and the measured fiber signal resulted from photons emitted at a source other than that photon source.

Estimating a location of a photon source by estimating a first value indicative of a first likelihood, the first likelihood being the likelihood that the measured photodetector signal and the measured fiber signal resulted from photons emitted at a first photon source; estimating a second value indicative of a second likelihood, the second likelihood being the likelihood that the measured photodetector signal and the measured fiber signal resulted from photons emitted at a second photon source; determining, on the basis of the first and second values, that the first likelihood is greater than the second likelihood; and designating the first photon source to be the photon source from which from which the photons that caused the measured photodetector signal and the measured fiber signal were emitted.

Another aspect of the invention includes a computer-readable medium on which is encoded software for estimating a location of a most-likely photon source on a scintillator block. The software includes instructions for obtaining a measured photodetector signal indicative of a distribution of photons received by a plurality of photodetectors from a photon source on a scintillator block, obtaining a measured fiber signal indicative of a distribution of photons received by a plurality of wavelength-shifting fibers extending across the scintillator block from a photon source on a scintillator block; estimating a location of a most-likely photon source on the scintillator block at least in part on the basis of the measured photodetector signal and at least in part on the basis of the measured fiber signal.

Embodiments of this aspect of the invention may include one or more of the following features.

The instructions for estimating a location of a most-likely photon source include instructions for comparing the measured photodetector signal with a set of known photodetector signals and comparing the measured fiber signal with a set of known fiber signals.

The software further includes instructions for reading a stored calibration table containing values derived from the set of known photodetector signals.

The software further includes instructions for reading a stored calibration table containing values derived from the set of known fiber signals.

The instructions for estimating a location of a most-likely photon source include instructions for estimating the likelihood that the measured photodetector signal and the measured fiber signal resulted from photons emitted at the most-likely photon source.

The instructions for estimating a location of a most-likely photon source include instructions for estimating the likelihood that the measured photodetector signal and the measured fiber signal resulted from photons emitted at each of a plurality of photon sources; and determining which of the plurality of photons sources is associated with the maximum likelihood that the measured photodetector signal and the measured fiber signal resulted from photons emitted at that photon source.

The instructions for estimating a location of a most-likely photon source include instructions for estimating the likelihood that the measured photodetector signal and the measured fiber signal resulted from photons emitted at a each of a plurality of photon sources; and identifying, from the plurality of photon sources, a most-likely photon source having the property that the likelihood that the measured photodetector signal and the measured fiber signal resulted from photons emitted at the most-likely photon source is greater than the likelihood that the measured photodetector signal and the measured fiber signal resulted from photons emitted at a source other than the most-likely photon source.

The instructions for estimating a location of a most-likely photon source include instructions for estimating a first value indicative of a first likelihood, the first likelihood being the likelihood that the measured photodetector signal and the measured fiber signal resulted from photons emitted at a first photon source; estimating a second value indicative of a second likelihood, the second likelihood being the likelihood that the measured photodetector signal and the measured fiber signal resulted from photons emitted at a second photon source; determining, on the basis of the first and second values, that the first likelihood is greater than the second likelihood; and designating the first photon source to be the most-likely photon source.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the present specification, including definitions, will control. In addition, the materials, methods, and examples are illustrative only and not intended to be limiting.

Other features and advantages of the invention will be apparent from the following detailed description, and from the claims.

DESCRIPTION

Figure 1:
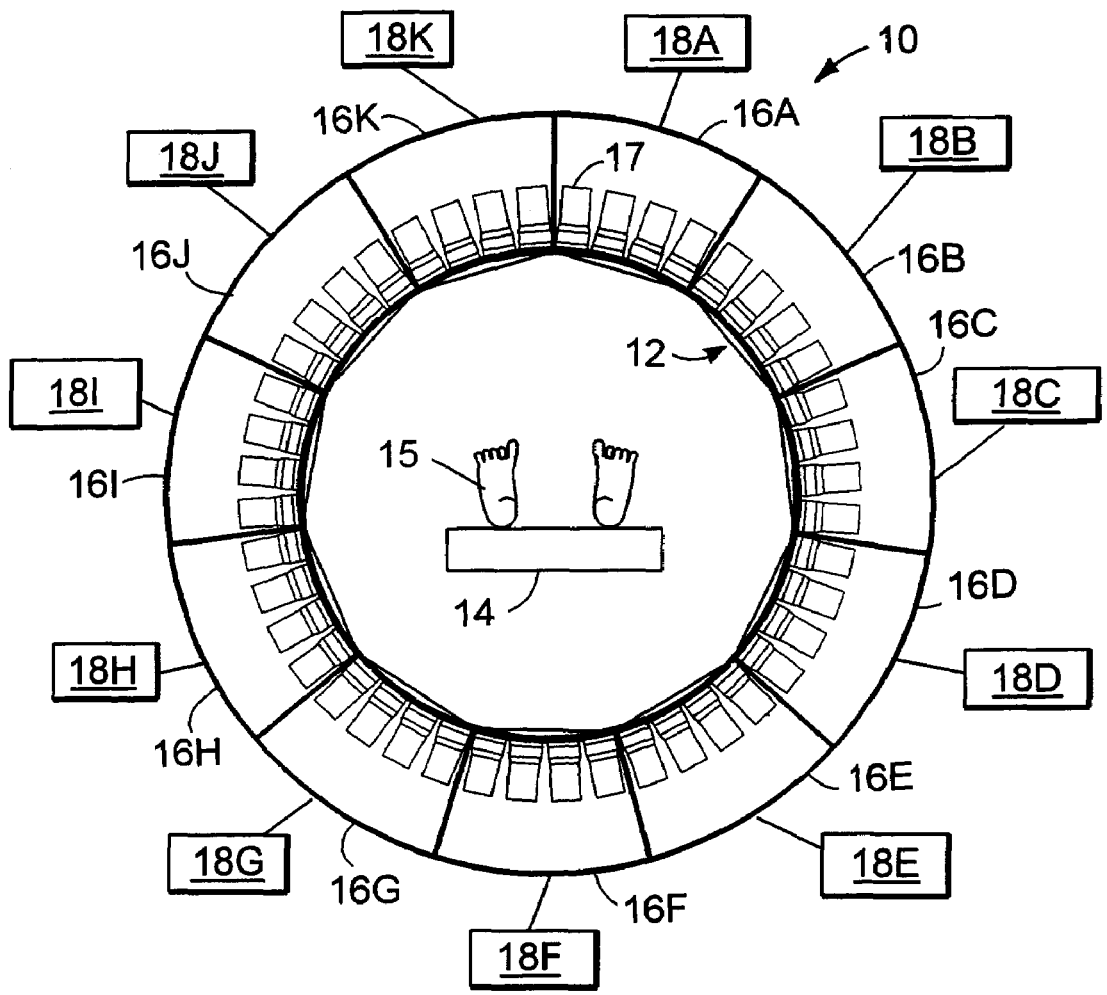
FIG. 1 shows a ring of modules.
Figure 2A:
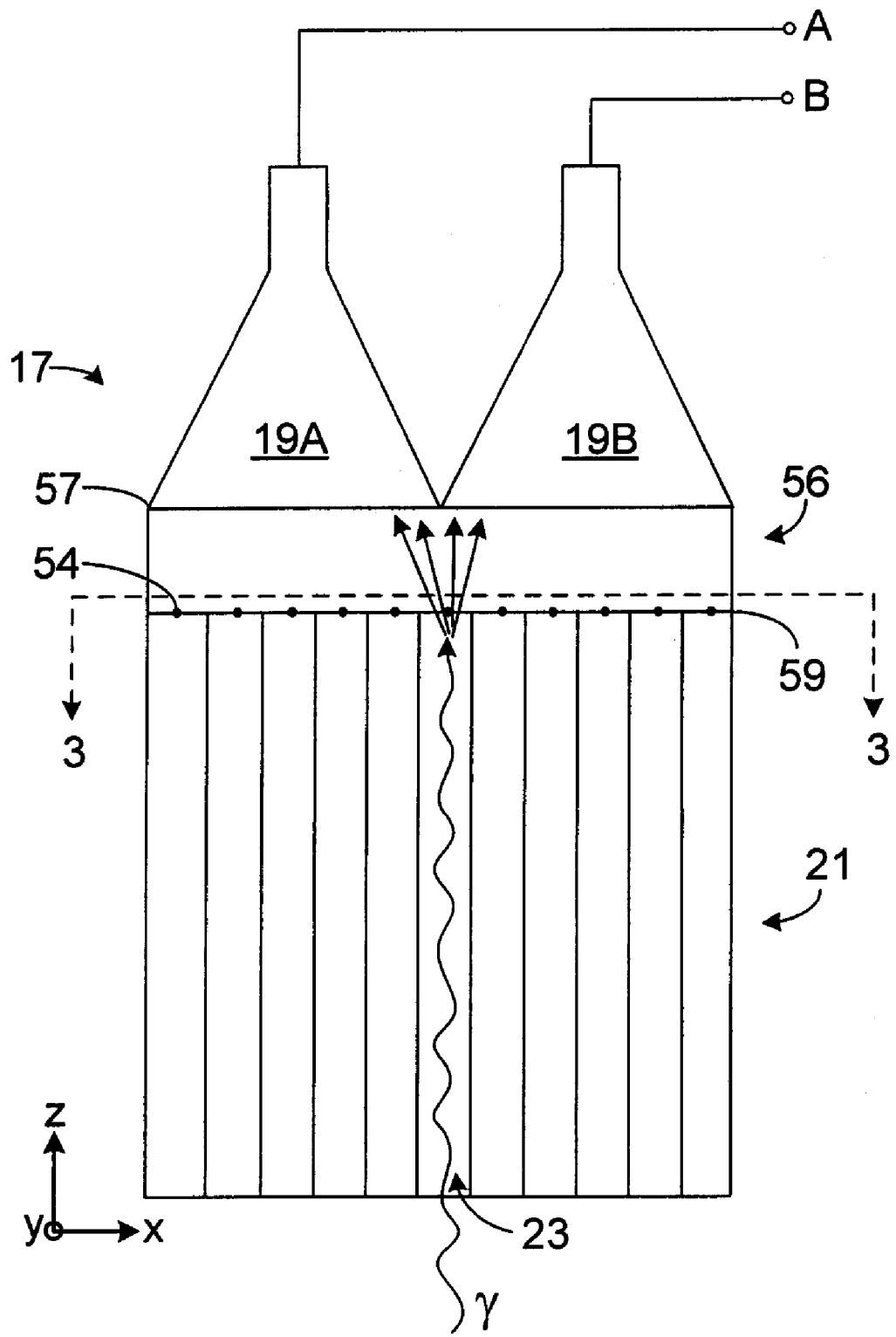
FIGS. 2A and 2B show a detector block.
Figure 2B:
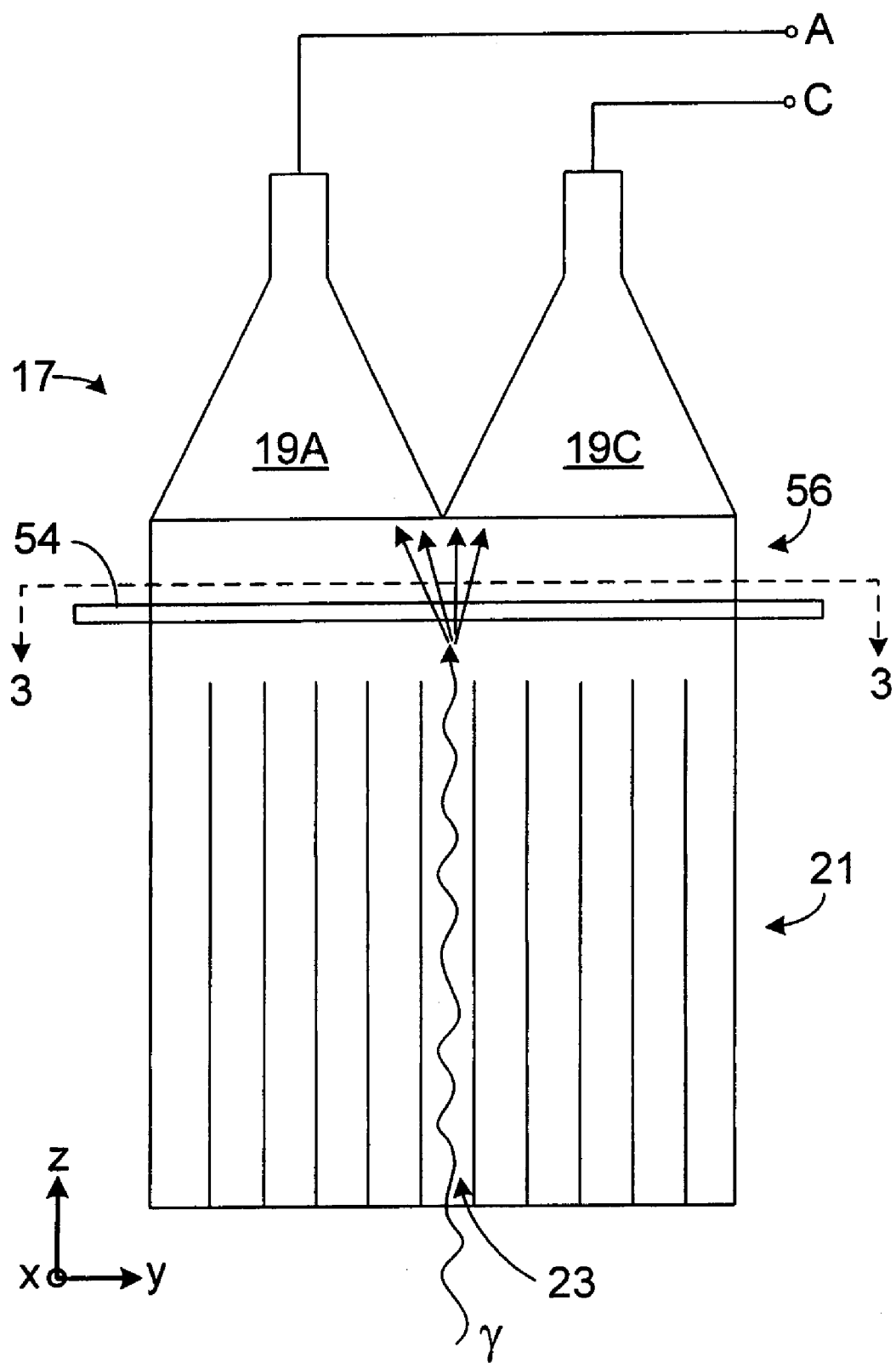

Referring to FIG. 1, a PET scanner 10 includes a ring 12 of detector modules 16A–K surrounding a bed 14 on which a patient 15 is to lie. Each detector module 16A–K (referred to as a "module") includes one or more rows of detector blocks 17. A detector block 17, shown in FIG. 2A, includes, for example, four photomultiplier tubes 19A–D arranged in a 2×2 array in optical communication with a scintillator block 21. The scintillator block 21 is typically made of CsI(Na) (sodium doped cesium iodide). Photomultiplier tubes 19A–B are visible in FIG. 2A and photomultiplier tubes 19A–C are visible in FIG. 2B. The remaining photomultiplier tube 19D, which lies diagonally across the array from photomultiplier tube 19A is not visible.

Figure 3:
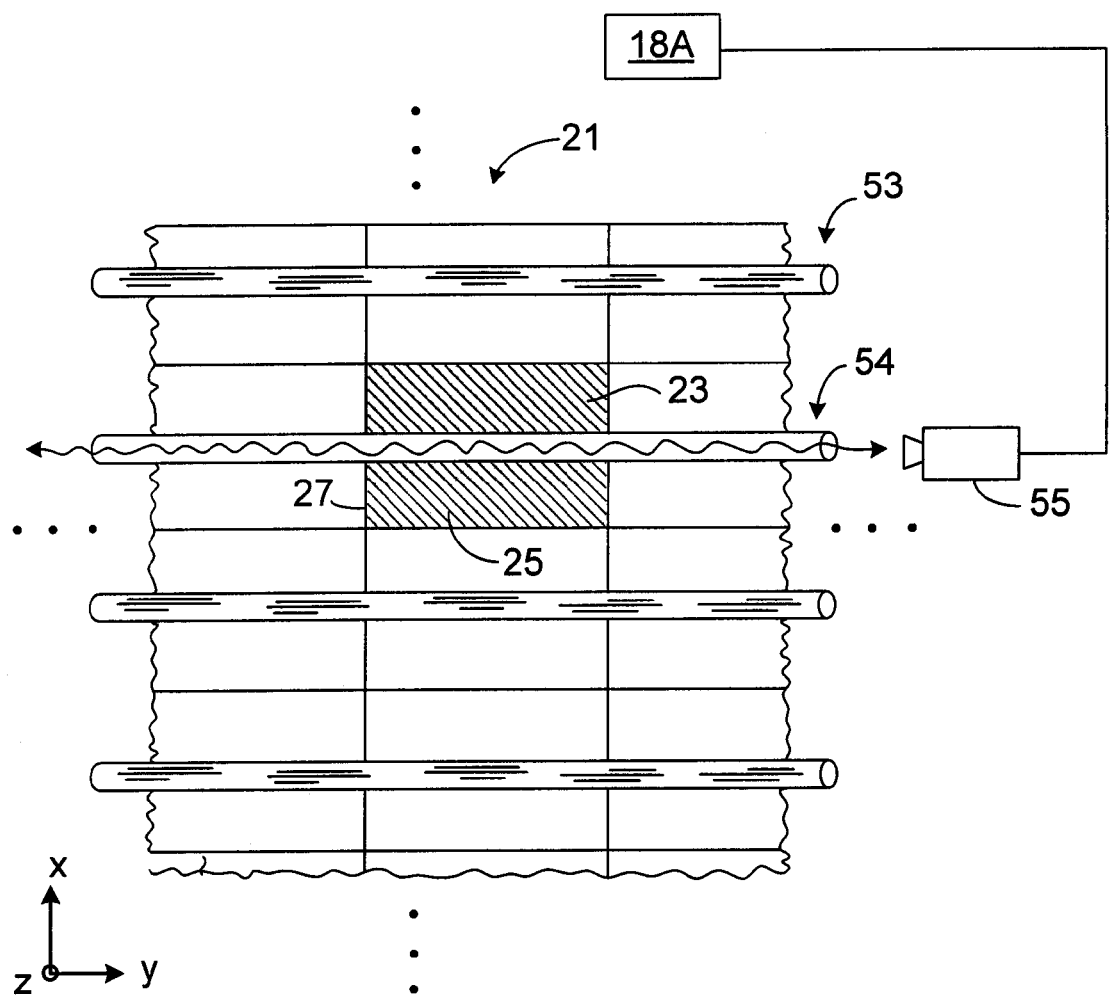
FIG. 3 shows the detector block of FIGS. 2A and 2B taken along the line 3—3.

The scintillator block 21 is divided into individual pillars 23 made of a scintillating crystal. The pillars 23 are arranged in an array, for example a 10×16 array, a portion of which is shown in FIG. 3. The array has a rectangular cross-section with a length of 3.22 inches (82 millimeters) and a width of 2.69 inches (68 millimeters).

Each pillar 23 in the array is a rectangular prism having a transverse cross-section with a long side 25 and a short side 27. The axis parallel to the long side 25 will be referred to herein as the "major" axis of the scintillator block 21, and the axis parallel to the short side 27 of the will be referred to herein as the "minor" axis of the scintillator block 21.

To image a portion of a patient with a PET scanner 10, one introduces a radioactive material into the patient. As the radioactive material decays, it emits positrons. A positron, after traveling a short distance through the patient, eventually encounters an electron. The resulting annihilation of the positron and the electron generates two gamma ray photons traveling in opposite directions. To the extent that neither of these gamma ray photons is deflected or absorbed within the patient, they emerge from the patient and strike two opposed pillars 23, thereby generating two flashes of light (referred to as "events") indicative of an annihilation occurring within the patient. By determining from which pillars 23 these light flashes originated, one can estimate where in the patient the annihilation event occurred.

In particular, referring again to FIG. 1, when one of these gamma ray photons strikes a pillar in a first detector module 16A, the other gamma ray photon strikes a pillar in a second detector module 16E, F, G, or H opposite the first detector module. This results in two events: one at the first detector module 16A and the other at the opposed second detector module 16E, F, G, or H. Each of these events indicates the detection of a gamma ray photon. If these two events are detected at the first detector module 16A and the second detector module 16E, F, G, or H at almost the same time, it is likely that they indicate an annihilation occurring on a line connecting first detector module 16A and the second detector module 16E, F, G, or H.

It is apparent that what is of interest in PET scanning are pairs of events detected by opposed detector modules 16A, 16E–F at, or almost at, the same time. A pair of events having these properties is referred to as a "coincidence." In the course of a PET scan, each detector module 16A–K detects a large number of events. However, only a limited number of these events represent coincidences.

Associated with each detector module 16A–K is a module processor 18A–K that responds to events detected by its associated detector module 16A–K. A module processor 18A–K includes a processing element and a memory element in data communication with each other. The processing element includes a computational element containing combinatorial logic elements for performing various logical operations, an instruction register, associated data registers, and a clock. During each clock interval, the processor fetches an instruction from the memory element and loads it into the instruction register. Data upon which the instruction is to operate is likewise loaded into the associated data registers. At subsequent clock intervals, the processing element executes that instruction. A sequence of such instructions is referred to herein as a "process."

Each module processor 18A–K executes a master process and a slave process concurrently. Each module processor 18A–K is simultaneously a master of two module processors and a slave to two other module processors. As used herein, "master" shall mean a module processor 18A–K acting as a master module processor and "slave" shall mean a module processor 18A–K acting as a slave module processor. The terms "master module" and "slave module" shall be used to refer to the detector modules 16A–K associated with the master and slave respectively.

The two slaves of each master are selected on the basis of the relative locations of their associated detector modules 16A–K on the ring 12. In particular, the slaves of each master are selected to maximize the likelihood that an event detected at the master detector module and an event detected at any one of the slave detector modules form a coincidence pair.

For the configuration of eleven detector modules shown in FIG. 1, the master/slave relationships among module processors 18A–K are as follows:

| MASTER | SLAVE_1 | SLAVE_2 |
|--------|---------|---------|
| 18A | 18E | 18F |
| 18B | 18F | 18G |
| 18C | 18G | 18H |
| 18D | 18H | 18I |
| 18E | 18I | 18J |
| 18F | 18J | 18K |
| 18G | 18K | 18A |
| 18H | 18A | 18B |
| 18I | 18B | 18C |
| 18J | 18C | 18D |
| 18K | 18D | 18E | and thus the slave/master relationships among module processors 18A–K are as follows:

| SLAVE | MASTER_1 | MASTER_2 |
|-------|----------|----------|
| 18A | 18G | 18H |
| 18B | 18H | 18I |
| 18C | 18I | 18J |
| 18D | 18J | 18K |
| 18E | 18K | 18A |
| 18F | 18A | 18B |
| 18G | 18B | 18C |
| 18H | 18C | 18D |
| 18I | 18D | 18E |
| 18J | 18E | 18F |
| 18K | 18F | 18G |

Figure 4:
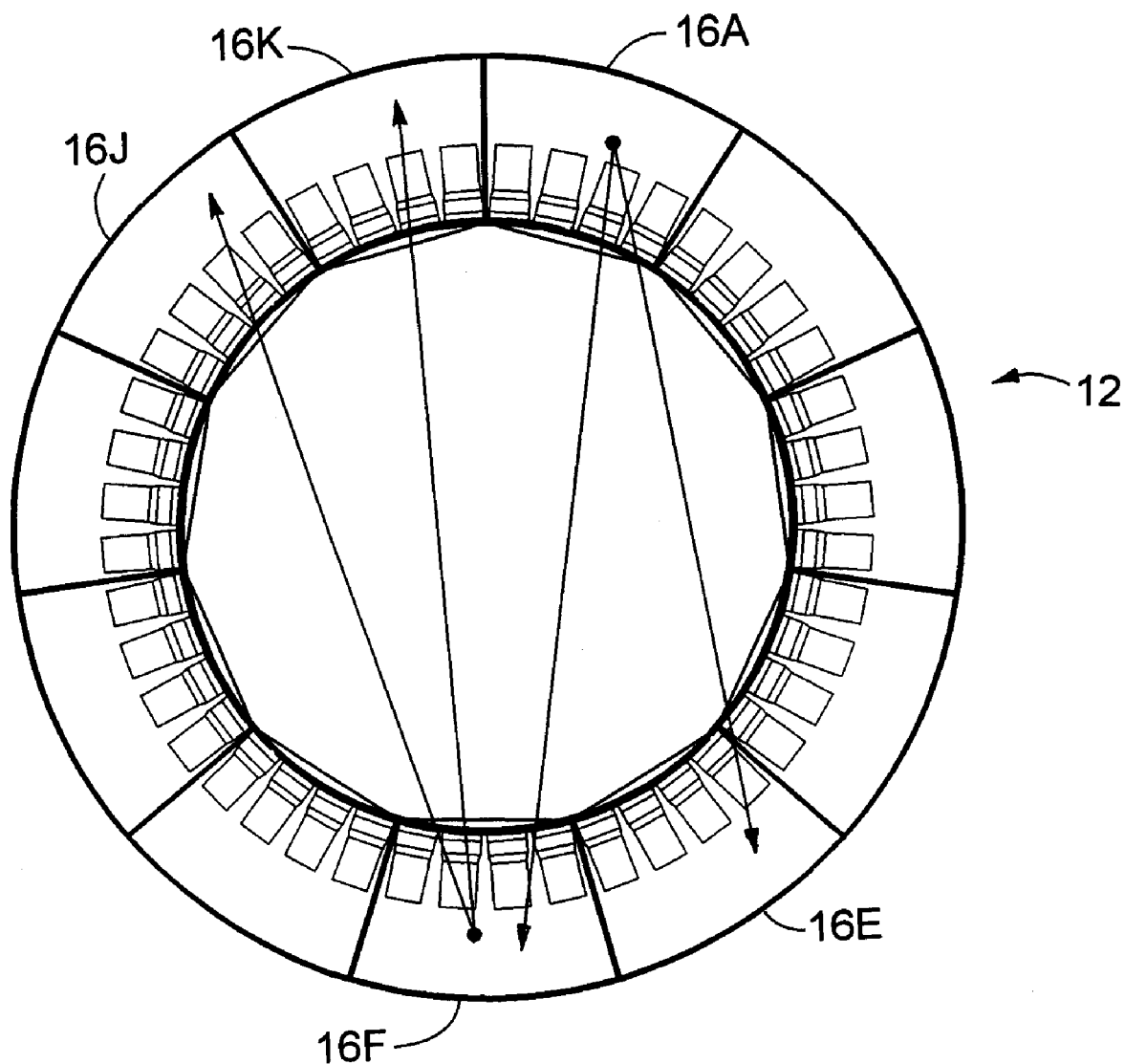
FIG. 4 shows master/slave relationships between a subset of the modules shown in FIG. 1.

FIG. 4 shows the ring 12 of FIG. 1 with lines added to show the master/slave relationships of two of the eleven module processors. The lines connecting detector modules 16A to 16E and detector modules 16A to 16F indicate that module processors 18E and 18F are slaves of module processor 18A. Module processor 18F has its own two slaves, as indicated by the lines connecting detector module 16F to detector modules 16J and 16K. The eighteen lines representing the remaining master/slave relationships are omitted for clarity.

Figure 5:
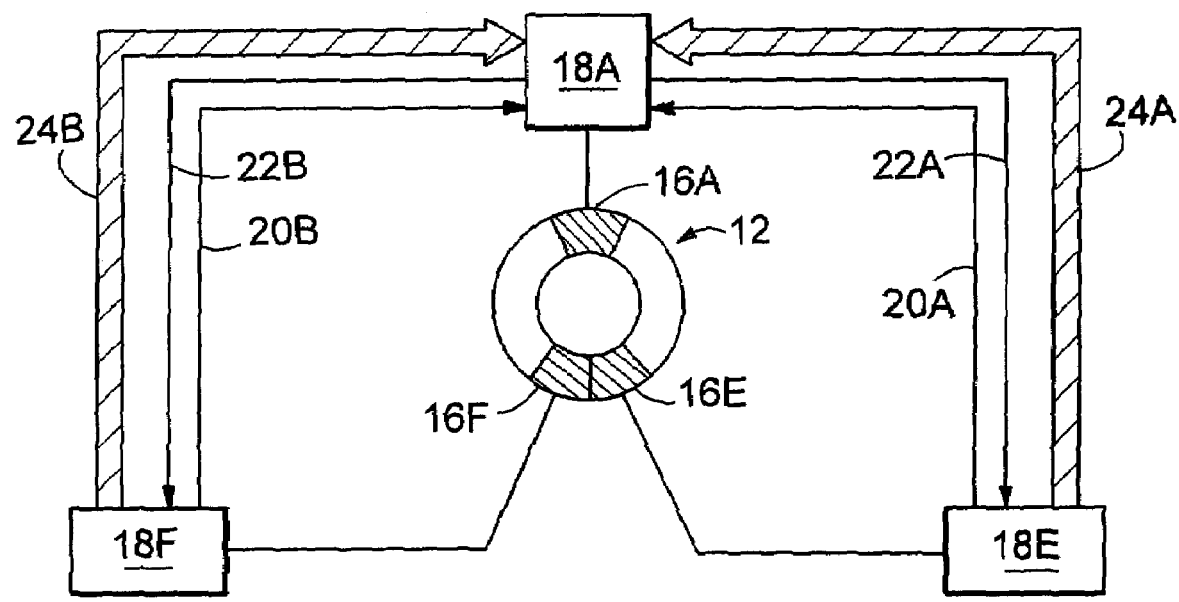
FIG. 5 shows connections between a master and its two slaves.

As shown in FIG. 5, a master 18A is connected to its first slave 18E by first and second data links 20A, 22A. Similarly, the master 18A is connected to its second slave 18F by additional first and second data links 20B, 22B. The first and second data links 20A–B, 22A–B are used to transmit trigger pulses between the master 18A and the corresponding slave 18E–F. Hence, the first and second data links 20A–B, 22A–B are typically each a single wire.

When a slave 18E receives, from its associated detector module 16E, a signal indicative of an event (hereinafter referred to as a "slave event"), it transmits a pulse to the master 18A on the first data link 20A. When the master 18A considers a slave event detected by the slave 18E to be a constituent event of a coincidence, it sends a pulse back to that slave 18E on the second data link 22A.

A third data link 24A–B, which is typically an LVDS ("low-voltage differential standard") channel connects the master 18A and each of its slaves 18E–F. The slaves 18E–F use this third data link 24A–B to transmit to the master 18A additional information about slave events. Such additional information can include, for example, the energy of the incident gamma ray photon that triggered that slave event and the waveform of the voltage signal generated by the photo multiplier tube.

Figure 6:
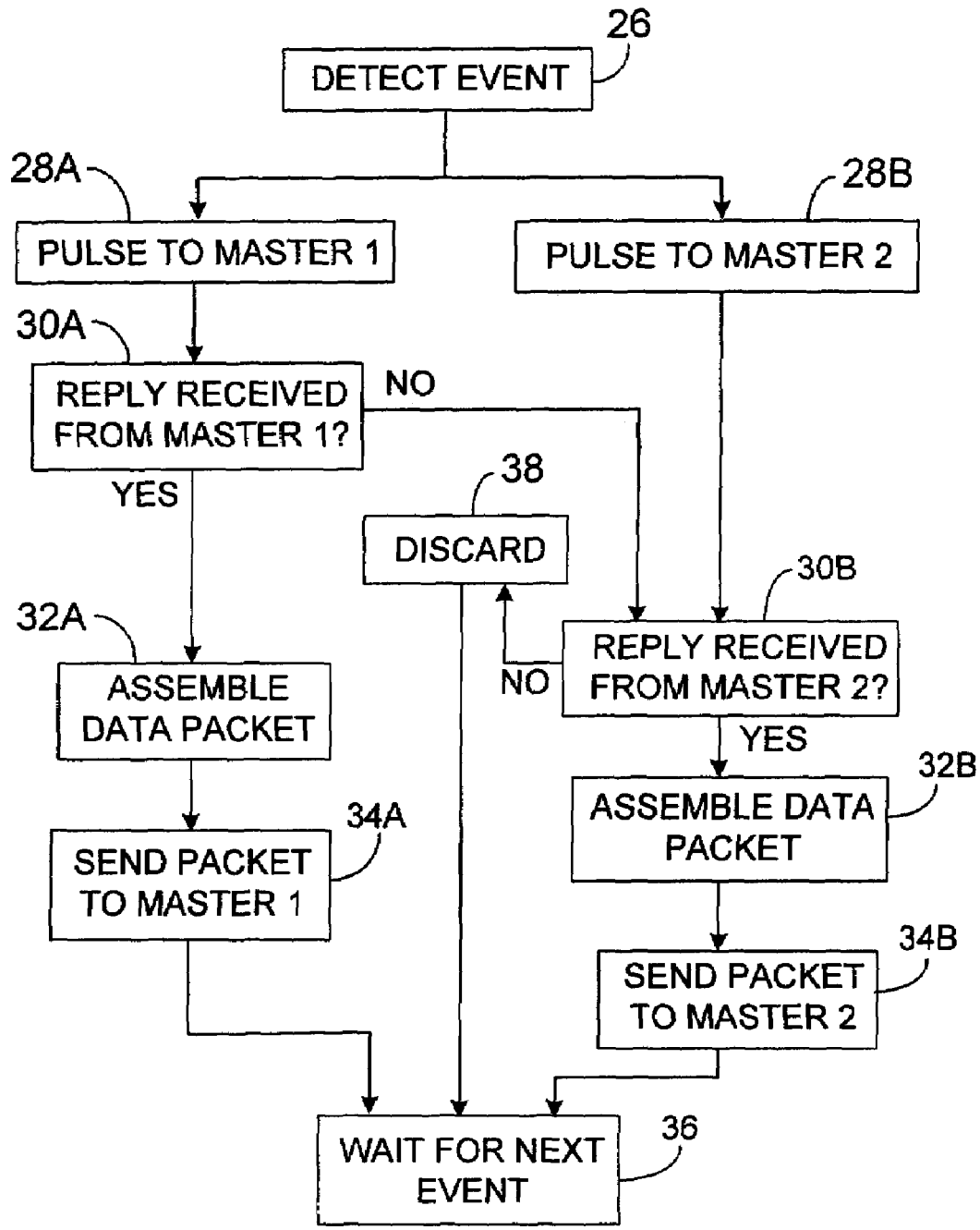
FIG. 6 is a flow-chart of a process carried out by a slave.

FIG. 6 shows the procedure carried out by a slave. Upon receiving, from its associated module processor, a signal indicative of a slave event (step 26), a slave reports the detection of that slave event to both of its respective masters (steps 28A–B). It does so by transmitting a pulse on each of two first data links that connect it to those masters. The slave then waits for a response from its masters on either of the two second data links connecting it to each of those two masters (steps 30A–B).

In response to a request pulse received on the second data link from a master, the slave prepares a data packet containing additional information about the slave event (steps 32A–B). This data packet is then transmitted on the third data link to whichever of its masters requested that additional information (steps 34A–B). After sending the data packet, the slave waits for the next event (step 36). If neither master sends a request pulse within a pre-defined time interval, the slave discards the slave event (step 38) and waits for the next slave event (step 36).

Figure 7:
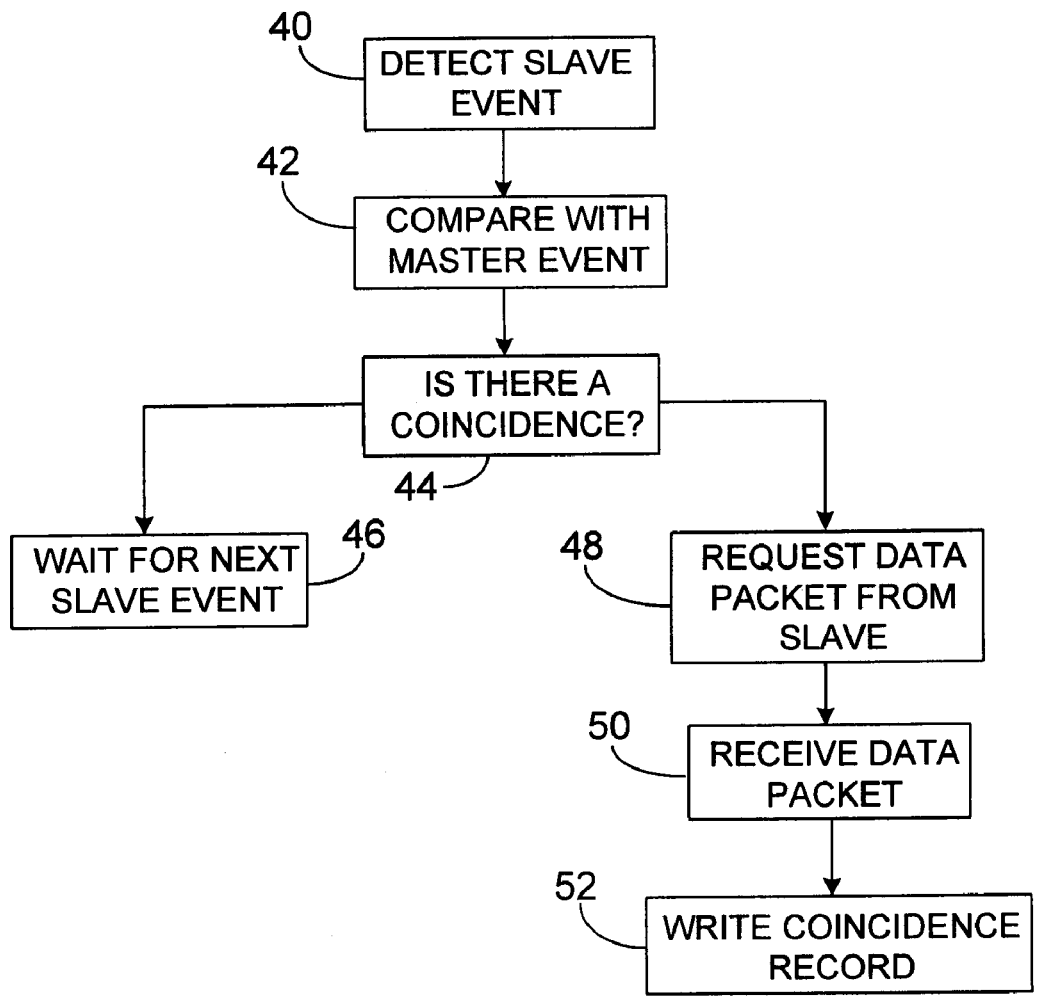
FIG. 7 is a flow-chart of a process carried out by a master.

FIG. 7 shows the procedure carried out by a master. Upon receiving, from its associated detector module, a signal indicative of a slave event (step 40), the master compares the occurrence time of that slave event with occurrence times of events (hereinafter referred to as "master events") received by its own associated detector module (step 42). If the occurrence times of a master event and a slave event differ by no more than a selected tolerance, the master considers that master event and that slave event to be a coincidence (step 44). Otherwise, the master ignores the slave event and waits for the next slave event (step 46).

Upon recognizing a coincidence between a master event and a slave event, the master transmits a request pulse to whichever slave detected that slave event (step 48). As described in connection with FIG. 6, this pulse is interpreted by the slave as a request for additional information about that slave event. The master then waits for the data packet containing additional information about the slave event.

Upon receiving the data packet (step 50), the master creates a coincidence record that includes information about the master event and the slave event that together make up the coincidence. This coincidence record is stored on a mass storage medium, such as a magnetic disk or a magnetic tape, (step 52) for later processing by an image-reconstruction process executing known tomography algorithms.

As described, each slave has two masters and each master has two slaves. However, there is no requirement that a slave have a particular number of masters or that a master have a particular number of slaves. Nor is there a requirement that each master have the same number of slaves or that each slave have the same number of masters.

The illustrated PET scanner 10 has eleven detector modules. However, a different number of detector modules can be used. The invention does not depend on the number of detector modules in the ring 12. It is topologically convenient, however, to have an odd number of detector modules.

In FIG. 6, the slave notifies the master of an event but withholds the information about the event until the master actually requests that information. This minimizes the probability that the third data link will be busy ferrying data packets from the slave to the master, thereby minimizing the probability that a data packet will be dropped. However, it also imposes some additional complexity since the master must now request data packets of interest.

Alternatively, the slave sends the master a data packet for each event detected at that slave's associated detector module. If the master does not consider the event to be part of a coincidence, it simply discards the data packet. This eliminates the need for the second data link since the master no longer has to signal the slave to send a data packet.

Referring back to FIGS. 2–3, each detector block 17 also includes wavelength-shifting optical fibers 54 extending parallel to the major axis of each row of pillars on the face of the scintillator block 21 nearest the object being imaged. The fibers 54 are spread across the face of the scintillator block 21, in a fiber array 53 as shown in FIG. 3, with one fiber 54 extending parallel to the major axis of each row of pillars 23. Each fiber 54 is in optical communication with a fluoremeter 55 that provides a signal to a respective processor 18A–K.

The walls of the fibers 54 are transparent to light emerging from the pillars 23. As a result, light that originates in one of the pillars 23 (the shaded pillar in FIG. 3) adjacent to a fiber 54 will introduce light into that fiber 54. A portion of this light is trapped within the fiber 54 and guided to the fluoremeter 55 associated with that fiber 54. By observing the spatial distribution of light across the detectors, and hence across the fibers 54, the processor 18A–K can determine from which row of pillars 23 of the scintillator block 21 the light originated. A PET scanner incorporating a ribbon of fibers 54 in this manner is described in U.S. Pat. No. 5,600,144, the contents of which are incorporated by reference.

Figure 8:
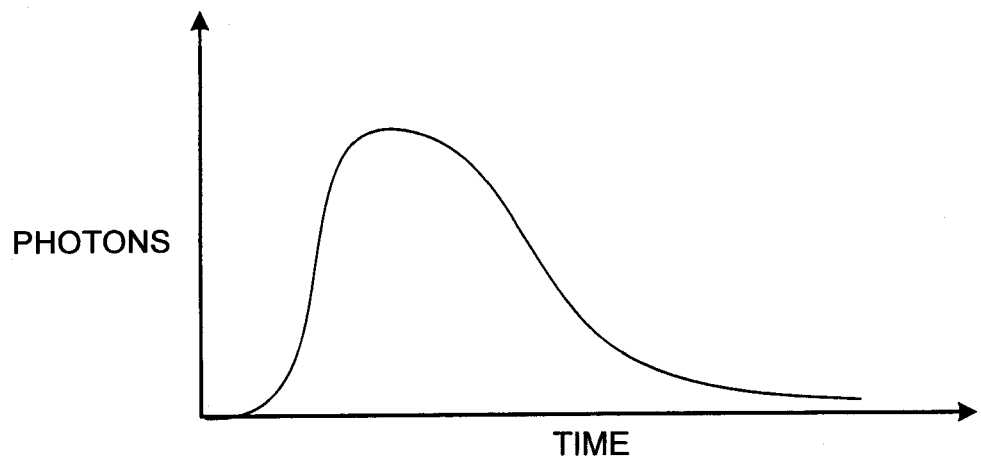
FIG. 8 shows a characteristic temporal distribution of scintillation photons arising from an interaction in a scintillation crystal.

The spray of scintillation photons during an event has a characteristic temporal distribution, shown in FIG. 8. As shown in FIG. 8, a sharp rise in the number of scintillation photons marks the moment of interaction between a gamma ray photon and the scintillation block 21. This is followed by a gradual decrease in the number of scintillation photons. The ability to determine precisely the moment of interaction depends in part on the ability to detect the sharp rise shown in FIG. 8.

If a detector could somehow detect all the scintillation photons emitted by the interaction, a measured temporal distribution of scintillation photons would match the actual temporal distribution shown in FIG. 8. However, at any instant, a detector can detect only those photons that travel toward that detector. The number of such photons is subject to statistical fluctuations. When the number of such photons is small, the measured temporal distribution of scintillation photons may be very different from the characteristic temporal distribution shown in FIG. 8. This adversely affects the ability to identify the precise moment of interaction.

The photomultiplier tube 19A–D, because of its large receiving cross-section, samples a large number of photons from the characteristic temporal distribution shown in FIG. 8. Because of this, the statistical fluctuations become less significant, and the temporal distribution as measured by a photomultiplier tube 19A–D tends to match the characteristic temporal distribution shown in FIG. 8. A photomultiplier tube 19A–D is thus able to determine the moment of impact with great precision, thereby enabling it to resolve events that occur very closely together in time. However, because of its large receiving cross-section, the photomultiplier tube 19A–D has poor spatial resolution, and is therefore unable to resolve events that occur very closely together in space.

In contrast, a fiber 54, because of its smaller receiving cross-section, provides finer spatial resolution than a photomultiplier tube 19A–D. However, the limited light-trapping efficiency of a fiber 54 prevents it from sampling as many scintillation photons as a photomultiplier tube 19A–D. Because of this, the temporal distribution as seen by the fiber 54 often looks quite different from the actual temporal distribution in FIG. 8. In particular, the sharp rise associated with the moment of interaction is often degraded. As a result, although the fiber array 53 can discriminate between events that occur very close to each other in the scintillation block 21, it cannot easily resolve events that occur very closely together in time.

The spatial resolution of the photomultiplier tubes 19A–D depends, in part, on the number of photomultiplier tubes 19A–D. For example, one could provide a large number of photomultiplier tubes, each with a smaller receiving cross-section. However, this would result in fewer scintillation photons being collected by each photomultiplier tube, thereby degrading the sharp rise associated with the moment of interaction as discussed above in connection with the fibers 54. Moreover, because of the expense of photomultiplier tubes, it is desirable to reduce the number of photomultiplier tubes while maintaining adequate spatial resolution. This is achieved by a providing a light mixer 56 positioned between the photomultiplier tubes 19A–D from the scintillator block 21.

The light mixer 56 is a layer of optically transparent material. An interface 59 between the scintillator block 21 and the light mixer 56 is coated with an index-matching layer to reduce reflections at that interface 59. Similarly, an interface 57 between the light mixer 56 and the photomultiplier tubes 19A–D is coated with an index-matching layer to reduce reflections at that interface 57.

A gamma ray photon entering a pillar 23 generates an isotropic spray of scintillation photons. These scintillation photons are scattered or reflected by structures within the optical element. Depending on which pillar the scintillation photons originate from, different numbers of scintillation photons strike the photomultiplier tubes 19A–D. As a result, the first, second, third and fourth photomultiplier tubes 19A–D generate corresponding first, second, third and fourth photomultiplier signals that depend on the number of scintillation photons detected by that photomultiplier tube 19A–D.

Figure 9A:
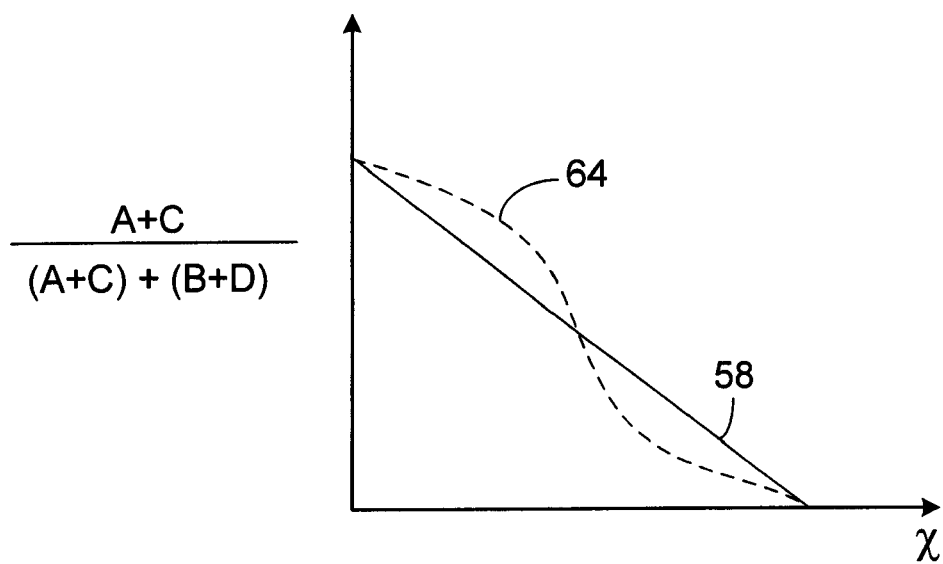
FIGS. 9A–C show exemplary response curves for detector blocks.
Figure 9B:
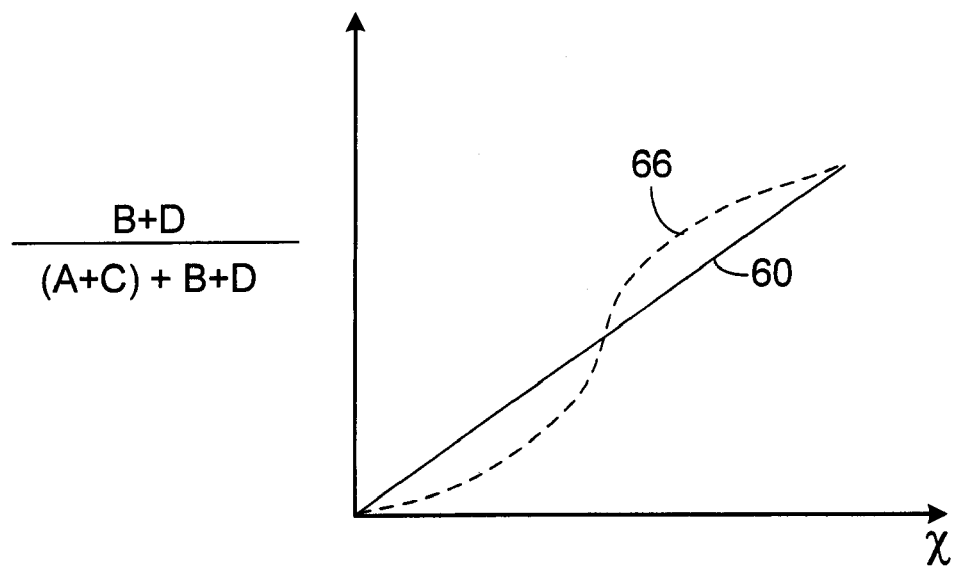

Ideally, the ratio of the sum of the first and third photomultiplier signals and the sum of all four photomultiplier signals depends linearly on the value of the second coordinate associated with the pillar 23 that emitted the light. Similarly, the ratio of the sum of the first and second photomultiplier signals and the sum of all four photomultiplier signals depends linearly on the value of the first coordinate associated with the pillar 23 that emitted the light. Exemplary ideal ratios are shown by the solid lines 58, 60 in FIGS. 9A and 9B. In addition, the sum of all four photomultiplier signals should be the same, no matter which pillar 23 emits the light, as shown by the solid line 62 in FIG. 9C.

Figure 10:
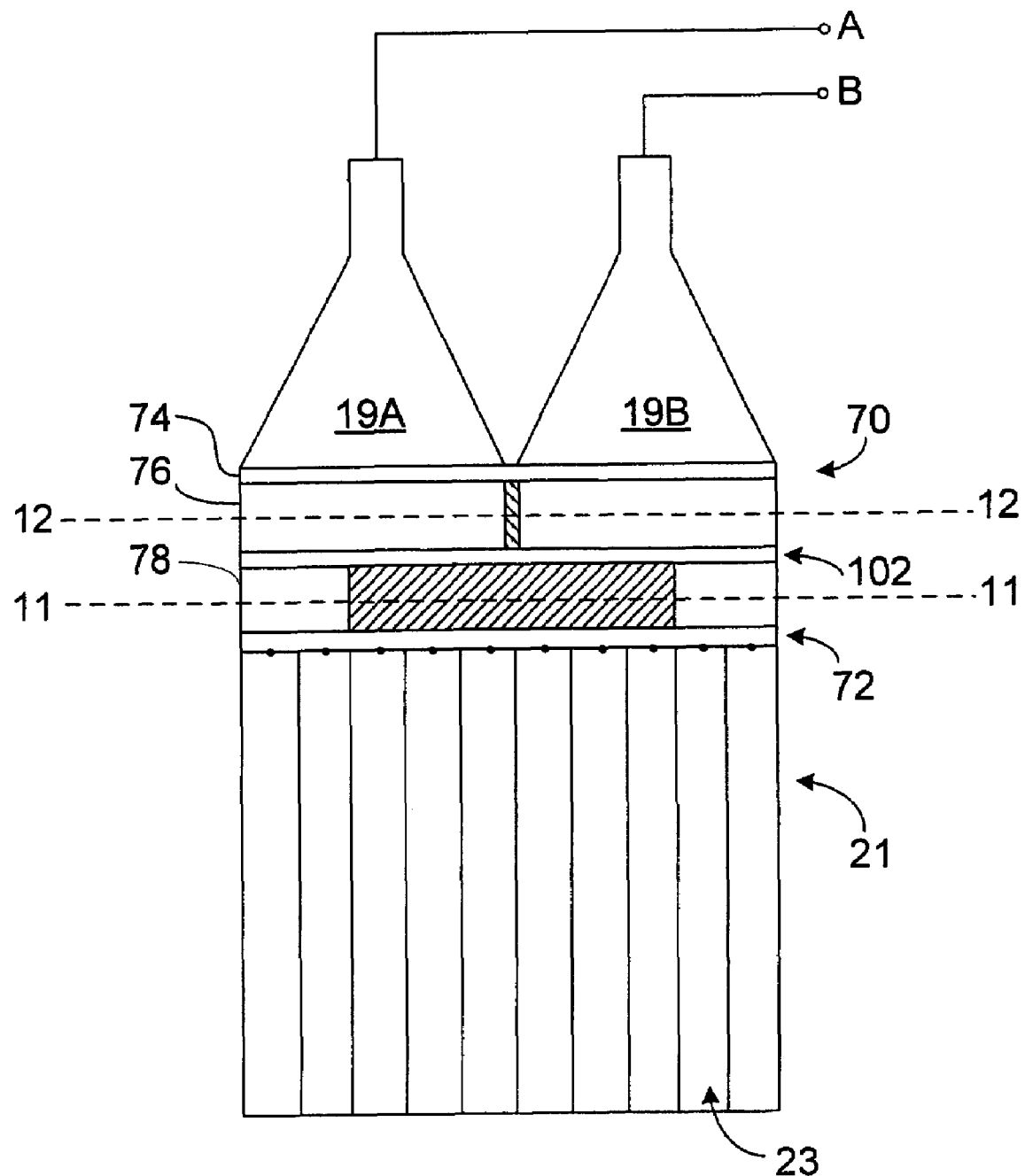
FIG. 10 is a cross-section of a structured optical element.

To avoid both non-linearity and crowning, a preferred optical element 70, shown in FIG. 10, is a structured optical element having a mixing layer 72 adjacent to the scintillator block 21, an unstructured cap layer 74 adjacent to the photomultiplier tubes 19A–D, a structured outer layer 76 adjacent to the cap layer 74, and a structured inner layer 78 between the mixing layer 72 and the structured outer layer 76. The four layers are all made of an optically transparent medium.

The mixing layer 72 of the optical element 70 is a layer of transparent material between approximately 0.05 and 0.12 inches thick, and preferably 0.08 inches thick. This mixing layer 72 permits light to mix freely for a short distance before entering the structured inner layer 78.

Figure 11:
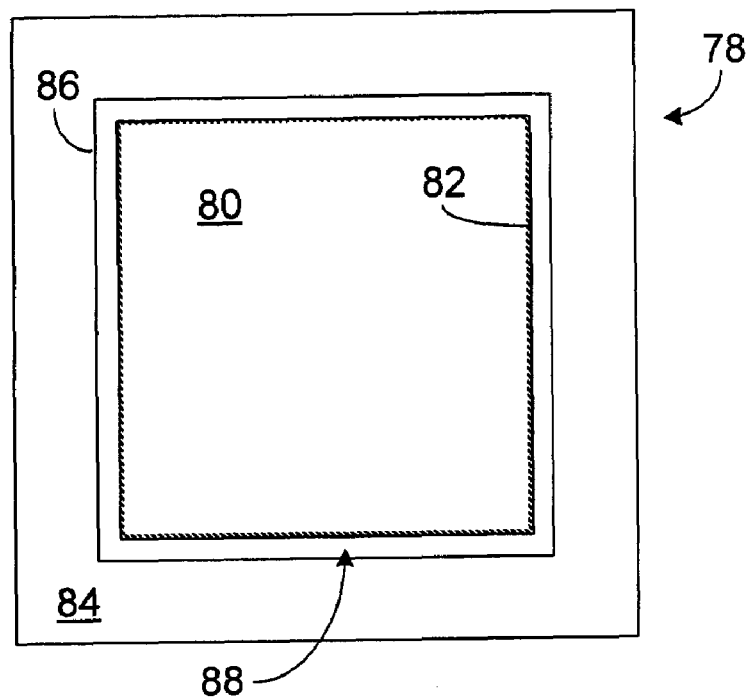
FIG. 11 is a plan view of the inner layer of the structured optical element of FIG. 10 taken along the line 11—11.

Referring to FIG. 11, the structured inner layer 78 includes an optically transparent central region 80 having an outer wall 82 extending parallel to the sides of the optical element 70 and an optically transparent peripheral region 84 having an inner wall 86 extending parallel to, but offset from, the outer wall 82 of the central region 80. As used here, "inner wall 86" refers to a surface that is in physical contact with the peripheral region 84 and "outer wall 82" refers to a surface that is in physical contact with the central region 80. The inner and outer walls 86, 82 thus define a rectangular gap 88 that separates the central region 80 from the peripheral region 84. The rectangular gap 88 can be filled with air or a material having a dielectric constant different from that of the optically transparent medium, thereby promoting total internal reflection within the central region 80 and the peripheral region 84. The width of the gap 88 is not critical, however it should be greater than a wavelength to suppress coupling across the gap 88.

The rectangular gap 88 can be offset from the walls of the mixer 70 so that exactly one pillar 23 lies underneath the peripheral region 84. This is advantageous because all photons emerging from the same pillar will then be subjected to the same physical environment. However, this is not required. The rectangular gap 88 can, for example, bisect a pillar 23.

The inner wall 86 of the peripheral region 84 is highly polished, so that scintillation photons in the peripheral region 84 that are incident on the inner wall 86 are specularly reflected. In contrast, the outer wall 82 of the central region 80 is roughened, so that scintillation photons in the central region 80 that are incident on the outer wall 82 are reflected in a random direction. As a result, the probability that a scintillation photon in the peripheral region 84 will reach the photomultiplier tube is greater than the probability that a scintillation photon in the central region 80 will reach the photomultiplier tube. This tends to enhance the response of the photomultiplier tubes 19 to scintillation photons in the peripheral region 84 relative to the response of the photomultiplier tubes 19 to scintillation photons in the central region 80.

Figure 9C:
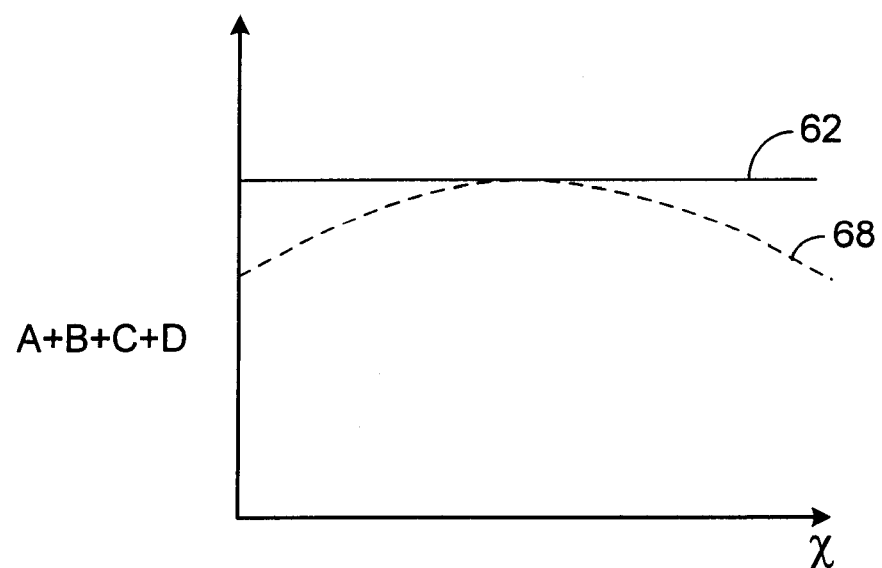

The dashed line 68 in FIG. 9C can be interpreted as a probability density function indicative of the likelihood that a scintillation photon originating at a particular value of the second coordinate will reach a photomultiplier tube 19A–D. In the conventional optical element, the probability density function 68 is non-uniform because scintillation photons originating in the central region 80 are more likely to reach the photomultiplier tube 19A–D than are scintillation photons originating in the peripheral region 84. The structured inner layer 78, by encouraging photons from the peripheral region 84 to reach the photomultiplier tubes 19A–D and simultaneously discouraging scintillation photons from the central region 80 from reaching the photomultiplier tubes 19A–D, tends to flatten the probability density function 68. This tends to make the sum of the first and second photomultiplier signals independent of the second coordinate.

Figure 12:
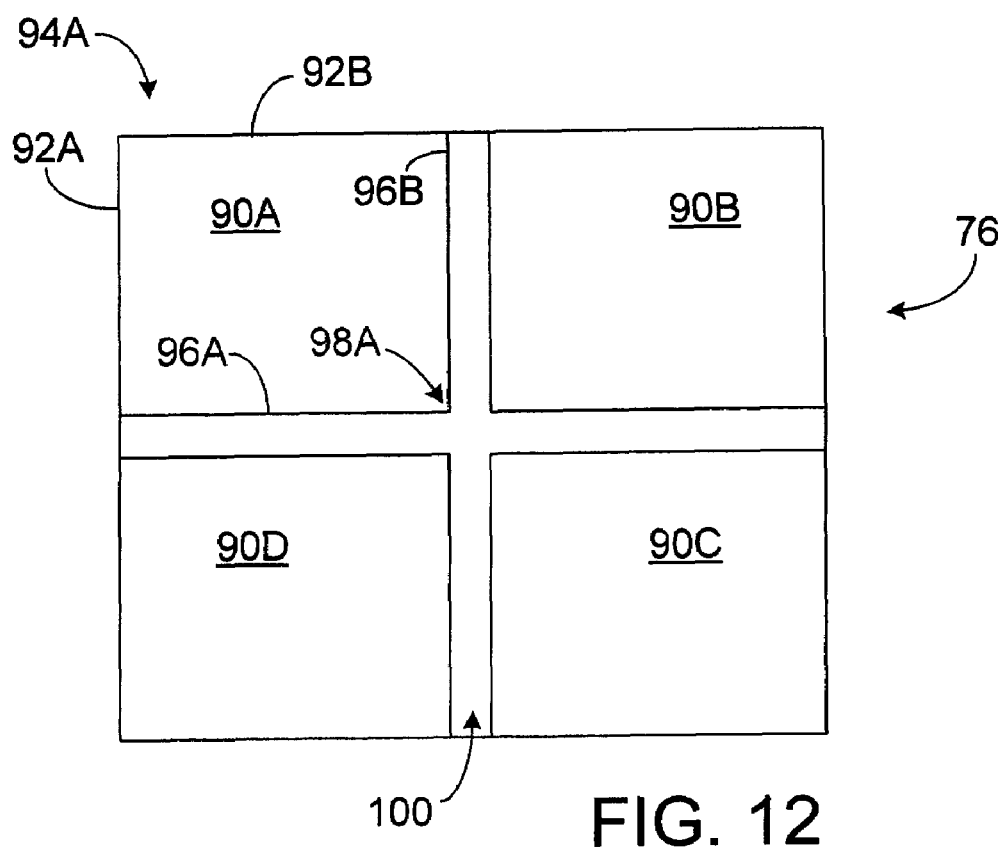
FIG. 12 is a plan view of the structured outer layer of the structured optical element of FIG. 10 taken along the line 12—12.

Referring now to FIG. 12, the structured outer layer 76 of the optical element 70 is made up of four optically transparent quadrants 90A–D, one corresponding to each photomultiplier tube 19A–D. Each quadrant 90A has two outer walls 92A, 92B that meet at an exterior corner 94A and two inner walls 96A, 96B that meet at an interior corner 98A. As used here, the inner walls 96A, 96B are in physical contact with the quadrant 90A with which they are associated. The inner walls 96A, 96B of each quadrant 90A are highly polished so that scintillation photons incident thereon are specularly reflected.

Collectively, the inner walls 96A, 96B of all four quadrants 90A–D form a cruciform gap 100 extending across the structured outer layer 76 in the directions of both the major axis and the minor axis. The cruciform gap 100 can be filled with air or a material having a dielectric constant different from that of the optically transmitting medium, thereby promoting total internal reflection within each quadrant 90A–D. The width of the gap 100 is not critical, however it should be greater than a wavelength to suppress coupling across the gap 100.

The structured inner layer 78 is 0.923 inches (16.8 mm) thick and the total thickness of the optical element 70 is 1.573 inches (39.9 mm). An optically transmissive layer 102, like the mixing layer 72, is optionally placed between the structured outer layer 76 and the structured inner layer 78. This optional layer 102 is approximately 0.15 inches (3.8 mm) thick. The length and width of the optical element 70 are 3.21 inches (81.8 mm) and 2.695 inches (94.4 mm) respectively. The cap layer 74 of optically transparent material can be placed over the structured outer layer 76, thereby preventing foreign matter from falling into the cruciform gap 100. This cap layer 74 is between 0.06 inches and 0.12 inches.

In the embodiment described here, there are four photomultiplier tubes 19A–D arranged in a grid. Hence, there are four regions 90A–D within the structured outer layer 76. The regions are disposed on the structured outer layer 76 so that each region 90A faces one 19A of the four photomultiplier tubes 19A–D. The resulting gap between the regions is thus a cruciform gap 100.

In other embodiments, there may be more than four photomultiplier tubes arranged in a rectangular array. In such cases, there will be a corresponding number of regions within the structured outer layer 76, with each region facing a corresponding photomultiplier tube. The resulting gap between regions will then define a grid. The walls defining the gap are highly polished so that scintillation photons incident on a wall from a particular region are specularly reflected back into that region.

In embodiments having many photomultiplier tubes, a structured inner layer 78 can have several nested peripheral regions surrounding the central region. These additional regions are shaped like the peripheral region and are separated from each other by gaps. Each gap has an inward-facing wall and an outward-facing wall. The inward-facing wall is roughened to discourage specular reflection and the outward-facing wall is highly polished to encourage specular reflection. The degree of roughening and polishing of each pair of inward-facing and outward-facing walls can change from one pair to the next, thereby enabling one to tune the inner layer to achieve the flattest possible response.

The optical element 70 is formed by casting the individual layers. The layers are then glued together with an index matching adhesive between the layers. To facilitate removal of the structured outer layer 76 and the structured inner layer 78 from the mold, the rectangular gap 88 and the cruciform gap 100 are typically made with a V-shaped profile.

In identifying at what time and at what pillar 23 an interaction takes place, it is advantageous to use both the information provided by the photomultiplier tubes 19A–D and that provided by the fiber array 53. With its superior temporal resolution, the photomultiplier tubes 19A–D would contribute information identifying when an event took place.

With its superior spatial resolution, the fiber array 53 would contribute information identifying where the event took place.

A difficulty in simultaneously exploiting information provided by the photomultiplier tubes 19A–D and by the fiber array 53 arises from the difficulty in correlating events detected by the photomultiplier tube 19A–D with events detected by the fiber array 53 when using a CsI(Na) scintillator block 21. A fiber 54 can resolve events separated by approximately 100 nanoseconds, whereas a photomultiplier tube 19A–D can resolve events separated by as little as 1 nanosecond. If the photomultiplier tubes 19A–D were to detect two events occurring less than 100 nanoseconds apart, it would be difficult to reliably identify the corresponding events as detected by the fiber array 53.

One method of associating events detected by the photomultiplier tubes 19A–D with those detected by the fiber array 53 is to first calibrate the detector modules 16A–K. During calibration, a 511 kEV gamma ray photon is made to enter a known pillar 23, thereby causing a spray of photons originating from that pillar 23. A subset of these photons reaches the photomultiplier tubes 19A–D and triggers a photomultiplier signal. A smaller subset of these photons reaches the fiber array 53 and triggers a fiber signal. The photomultiplier signal and the fiber signal are both recorded and identified as being associated with an interaction occurring in the known pillar 23.

The foregoing procedure is repeated many times. With each repetition, a new photomultiplier signal and a new fiber signal are generated and recorded. The resulting set of recorded fiber signals is then averaged together to obtain a baseline fiber response to an interaction occurring within the known pillar 23. Similarly, the resulting set of recorded photomultiplier signals is averaged together to obtain a baseline photomultiplier response to an interaction occurring within the known pillar 23.

The calibration procedure for a known pillar 23, as set forth above, is repeated for each pillar 23 in the detector module 16A–K. The end result of the calibrating procedure is thus a pair of calibration tables: a photomultiplier calibration table and a fiber calibration table. The photomultiplier calibration table shows, for each pillar 23, the baseline photomultiplier response to an interaction occurring in that pillar 23. The fiber calibration table shows, for each pillar 23, the baseline fiber response to an interaction occurring in that pillar 23.

When the PET scanner 10 is in use, the photomultiplier tubes 19A–D will periodically generate measured photomultiplier signals in response to interactions occurring at unknown pillars at uncertain times. A measured photomultiplier signal will in general be different from any of the baseline photomultiplier responses available in the photomultiplier calibration table. Nevertheless, a measured photomultiplier signal represents a sample from a sample space of photomultiplier signals having a known average: namely the baseline photomultiplier response. As a result, it is possible to calculate, using known discrete maximum likelihood methods, the likelihood that the measured photomultiplier signal comes from a sample space having, as its average, the known baseline photomultiplier response.

Similarly, when the PET scanner 10 is in use, the fiber array 53 will periodically generate received fiber signals in response to interactions occurring at unknown pillars at uncertain times. A measured fiber signal will in general be different from any of the baseline fiber responses available in the fiber calibration table. Nevertheless, a measured fiber signal represents a sample from a sample space of fiber signals having a known average: namely the baseline fiber response. As a result, it is possible to calculate, using known discrete maximum likelihood methods, the likelihood that the measured fiber signal comes from a sample space having, as its average, the known baseline fiber response.

To determine whether a measured fiber signal and a measured photomultiplier signal are associated with each other, a module processor calculates, for each pillar 23, the likelihood that the measured fiber signal and the measured photomultiplier signal were generated by an interaction occurring in that pillar 23. The pillar 23 for which this likelihood is the highest is referred herein as the "most likely pillar." If the likelihood associated with the most likely pillar is in excess of a selected threshold, then the measured fiber signal and the measured photomultiplier signal are considered to have been generated by the same interaction at that pillar 23.

It is also possible to calculate, using known statistical techniques, the probability that the most likely pillar is indeed the correct pillar. Such techniques include calculating likelihood ratios in which the numerator is the probability that the most likely pillar is the correct pillar and the denominator is a sum of the foregoing probability and the probability that another pillar, for example the next most-likely pillar, is the correct pillar. Such a ratio would provide a measure of the quality of the estimate.

The foregoing method can also be adapted to cases in which the actual probabilities are not known. In such cases, a quantity whose value is correlated with the actual probability can be used instead.

Other implementations are within the scope of the following claims.

The invention claimed is:

1. An apparatus for estimating the location of an area on a scintillator block, the apparatus comprising:
   photodetectors disposed to receive photons from a scintillator block of a PET scanner and configured to provide a measured photodetector signal indicative of a distribution of photons detected by the photodetectors;
   wavelength-shifting fibers disposed to receive photons from the scintillator block and configured to provide a measured fiber signal indicative of a distribution of photons received by the fibers; and
   a processor configured to estimate, on the basis of both the measured photodetector signal and the measured fiber signal, a location of a discrete area on a surface of the scintillator block from which the photons emerge.

2. The apparatus of claim 1, wherein the processor is configured to estimate a location of a discrete area based on a reference photodetector signal.

3. The apparatus of claim 2, further comprising a stored calibration table containing values derived from the set of known photodetector signals.

4. The apparatus of claim 1, wherein the processor is configured to estimate a location of a discrete area based on a reference fiber signal.

5. The apparatus of claim 4, further comprising a stored calibration table containing values derived from the set of known fiber signals.

6. The apparatus of claim 1, wherein the processor is configured to estimate an extent to which the estimated location is the correct location.

7. The apparatus of claim 1, wherein the processor is configured to estimate a location of a discrete area by estimating the likelihood that the measured photodetector signal and the measured fiber signal resulted from photons emerging from the discrete area.

8. The apparatus of claim 1, wherein the processor is configured to estimate a location of a discrete area by:
   estimating the likelihood that the measured photodetector signal and the measured fiber signal resulted from photons emerging from each of a plurality of discrete areas on the surface of the scintillator block.

9. The apparatus of claim 8, wherein the processor is configured to estimate a location of a discrete area by determining which of the discrete areas is associated with the maximum likelihood that the measured photodetector signal and the measured fiber signal resulted from photons emerging from that discrete area.

10. The apparatus of claim 1, wherein the processor is configured to estimate a location of a discrete area by:
   estimating a first value indicative of a first likelihood, the first likelihood being the likelihood that the measured photodetector signal and the measured fiber signal resulted from photons emerging from a first discrete area;
   estimating a second value indicative of a second likelihood, the second likelihood being the likelihood that the measured photodetector signal and the measured fiber signal resulted from photons emerging from a second discrete area;
   determining, on the basis of the first and second values, that the first likelihood is greater than the second likelihood; and
   designating the first discrete area to be the discrete area from which the photons that caused the measured photodetector signal and the measured fiber signal emerged.

11. A method of estimating a location of a discrete area on the surface of scintillator block, the method comprising:
   obtaining a measured photodetector signal indicative of a distribution of photons received by a plurality of photodetectors; and
   obtaining a measured fiber signal indicative of a distribution of photons received by a plurality of wavelength-shifting fibers extending across the scintillator block;
   on the basis of both the measured fiber signal and the measured photodetector signal, estimating a location of a discrete area on the surface of the scintillator block from which the photons emerge.

12. The method of claim 11, wherein estimating a location of the discrete area comprises estimating the location based on a reference photodetector signal.

13. The method of claim 12, further comprising reading a stored calibration table containing values derived from the set of known photodetector signals.

14. The method of claim 11, wherein estimating a location of the discrete area comprises estimating the location based on a reference fiber signal.

15. The method of claim 14, further comprising reading a stored calibration table containing values derived from the set of known fiber signals.

16. The method of claim 11, further comprising estimating an extent to which the estimated location is the correct location.

17. The method of claim 11, wherein estimating a location of a discrete area comprises estimating the likelihood that the measured photodetector signal and the measured fiber signal resulted from photons emerging from the discrete area.

18. The method of claim 11, wherein estimating a location of a discrete area comprises:
   estimating the likelihood that the measured photodetector signal and the measured fiber signal resulted from photons emerging from each of a plurality of discrete areas.

19. The method of claim 11, wherein estimating a location of a discrete area comprises:
   identifying, from a plurality of discrete areas, a discrete area having the property that the likelihood that the measured photodetector signal and the measured fiber signal resulted from photons emerging from that discrete area is greater than the likelihood that the measured photodetector signal and the measured fiber signal resulted from photons emerging from a a discrete area other than that discrete area.

20. The method of claim 11, wherein estimating a location of a discrete area comprises:
   estimating a first value indicative of a first likelihood, the first likelihood being the likelihood that the measured photodetector signal and the measured fiber signal resulted from photons emerging from a first discrete area;
   estimating a second value indicative of a second likelihood, the second likelihood being the likelihood that the measured photodetector signal and the measured fiber signal resulted from photons emerging from a second discrete area;
   determining, on the basis of the first and second values, that the first likelihood is greater than the second likelihood; and
   designating the first discrete area to be the discrete area from which the photons that caused the measured photodetector signal and the measured fiber signal emerged.

21. A computer-readable medium having encoded thereon software for estimating a location of a discrete area on the surface of a scintillator block, the software comprising instructions for:
   obtaining a measured photodetector signal indicative of a distribution of photons received by a plurality of photodetectors;
   obtaining a measured fiber signal indicative of a distribution of photons received by a plurality of wavelength-shifting fibers extending across the scintillator block; and
   estimating, on the basis of both the measured photodetector signal and the measured fiber signal, a location of a discrete area on the surface of the scintillation block from which the photons emerged.

22. The computer-readable medium of claim 21, wherein the instructions for estimating a location of a discrete area comprise instructions for comparing the measured photodetector signal with a set of known photodetector signals and comparing the measured fiber signal with a set of known fiber signals.

23. The computer-readable medium of claim 22, wherein the software further comprises instructions for reading a stored calibration table containing values derived from the set of known photodetector signals.

24. The computer-readable medium of claim 22, wherein the software further comprises instructions for reading a stored calibration table containing values derived from the set of known fiber signals.

25. The computer-readable medium of claim 21, wherein the instructions for estimating a location of a discrete area comprise instructions for estimating the likelihood that the measured photodetector signal and the measured fiber signal resulted from photons emerging from the discrete area.

26. The computer-readable medium of claim 21, wherein the instructions estimating a location of a discrete area comprise instructions for:
- estimating the likelihood that the measured photodetector signal and the measured fiber signal resulted from photons emerging from each of a plurality of discrete areas; and
- determining which of the plurality of discrete areas is associated with the maximum likelihood that the measured photodetector signal and the measured fiber signal resulted from photons emerging from that discrete area.

27. The computer-readable medium of claim 21, wherein the instructions for estimating a location of a discrete area comprise instructions for:
- estimating the likelihood that the measured photodetector signal and the measured fiber signal resulted from photons emerging from each of a plurality of discrete areas; and
- identifying, from the plurality of discrete areas, a most-likely discrete area having the property that the likelihood that the measured photodetector signal and the measured fiber signal resulted from photons emerging from that discrete area is greater than the likelihood that the measured photodetector signal and the measured fiber signal resulted from photons emerging from a discrete area other than the most-likely discrete area.

* * * * *